US008147665B2

(12) United States Patent
Livache et al.

(10) Patent No.: US 8,147,665 B2
(45) Date of Patent: Apr. 3, 2012

(54) DEVICE FOR RECEIVING A FLUID SAMPLE AND APPLICATIONS THEREOF

(75) Inventors: Thierry Livache, Haute Jarrie (FR); Bruno Corso, Orsan (FR); Thibaut Mercey, Paris (FR); Nathalie Lassalle, Nancy (FR)

(73) Assignees: Commissariat a l'Energie Atomique, Paris (FR); Genoptics, Orsay (FR)

( * ) Notice: Subject to any disclaimer, the term of this patent is extended or adjusted under 35 U.S.C. 154(b) by 1417 days.

(21) Appl. No.: 10/578,318

(22) PCT Filed: Nov. 15, 2004

(86) PCT No.: PCT/FR2004/050587

§ 371 (c)(1),
(2), (4) Date: Dec. 20, 2006

(87) PCT Pub. No.: WO2005/049210

PCT Pub. Date: Jun. 2, 2005

(65) Prior Publication Data

US 2007/0080076 A1 Apr. 12, 2007

(30) Foreign Application Priority Data

Nov. 14, 2003 (FR) .................................... 03 13340

(51) Int. Cl.
*G01N 27/327* (2006.01)

(52) U.S. Cl. .................... 204/403.01; 205/792; 205/779

(58) Field of Classification Search .................. 422/100; 118/243, 263, 401, 410, 411, 412, 407; 239/225.1; 73/864.02; 101/494; 436/180; 204/400–435; 205/775–794.5

See application file for complete search history.

(56) References Cited

U.S. PATENT DOCUMENTS 4,939,410 A * 7/1990 Nagy et al. ............... 313/231.01
5,486,337 A 1/1996 Ohkawa
5,763,278 A 6/1998 Sickinger et al.
5,770,151 A 6/1998 Roach et al.

(Continued)

FOREIGN PATENT DOCUMENTS

FR 2 789 401 8/2000

(Continued)

OTHER PUBLICATIONS

Office Action issued in Japanese Patent Application No. 2006-538913, mailed on Mar. 4, 2010 (with translation).

*Primary Examiner* — Alex Noguerola
*Assistant Examiner* — Gurpreet Kaur
(74) *Attorney, Agent, or Firm* — Oliff & Berridge, PLC

(57) ABSTRACT

The invention relates to a device for receiving a fluid sample, which is designed such as to form an electrode, such as a counter electrode or a working electrode, in an electrochemical cell. The inventive device comprises an end part having at least one cavity which opens to the exterior via an opening and which is equipped with a base. The invention is characterized in that the aforementioned end part comprises a first electrically-insulating hydrophobic zone which is adjacent to the cavity opening and a second electrically-conducting hydrophilic zone which is adjacent to the first zone and which at least partially covers the base of the cavity, such that, when the end part is immersed in the fluid and then removed therefrom, the cavity retains part of the fluid by means of capillary action.

32 Claims, 4 Drawing Sheets

U.S. PATENT DOCUMENTS

Figure 1:
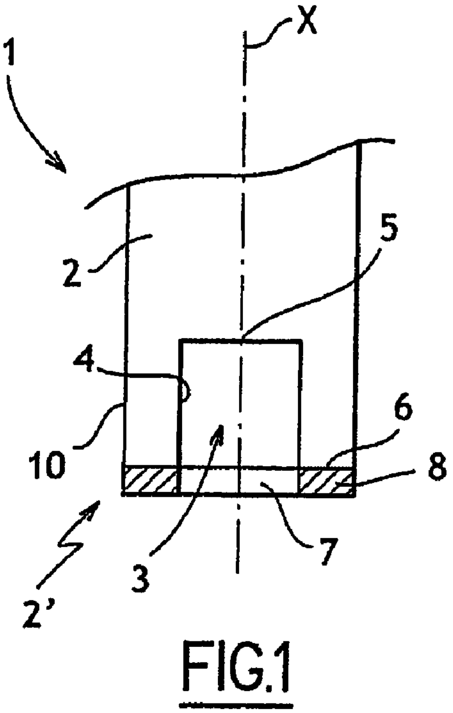

| | | | | |
|---|---|---|---|---|
| 5,807,522 | A | 9/1998 | Brown et al. | |
| 6,101,946 | A | 8/2000 | Martinsky | |
| 6,365,349 | B1 | 4/2002 | Moynihan et al. | |
| 6,416,294 | B1 | 7/2002 | Zengerle et al. | |
| 2001/0010206 | A1 * | 8/2001 | Bryning et al. | 118/669 |
| 2002/0137083 | A1 | 9/2002 | Kobori et al. | |

FOREIGN PATENT DOCUMENTS

| | | | |
|---|---|---|---|
| FR | 2 839 662 | | 11/2003 |
| WO | WO 99/36760 | | 7/1999 |
| WO | WO 00/25923 | | 5/2000 |
| WO | WO 01/71311 | A2 | 9/2001 |

* cited by examiner

DEVICE FOR RECEIVING A FLUID SAMPLE AND APPLICATIONS THEREOF

The invention relates to a device for receiving a fluid sample and to the use thereof. The invention relates in particular to a device that makes it possible in particular to sample a small amount of a fluid in a sampling zone and to transport the fluid sampled so as to deposit it, in a depositing zone, on a substrate.

The device of the invention can also be used as an electrochemical microcell.

The invention can be used especially in the biotechnology sector, and in particular in the field, currently in full expansion, of the analysis of biological samples, or in the study of the reactivity or the affinity of a molecule compared with one or more other molecules. The invention can also be used in the more general field of material analysis.

Devices for transferring fluid samples of biological origin, or containing purified molecules produced in vitro or in vivo are currently of increasing importance. It is known that one of the recent tendencies in this field is to miniaturize the devices and to minimize the amounts of reagents to be used and/or of products to be analyzed or to be studied. In fact, the amounts of products available are often very small, or the products are very expensive. For these reasons, use is increasingly made of devices that make it possible to perform, on appropriate substrates, spot deposits organized in microarrays. These substrates are subsequently brought into contact with known or unknown products that may have an interaction (reactivity or affinity) with respect to the molecule(s) deposited in the microarray. An analysis is then carried out using a detection system, which may, for example, be optical, chemical, electrochemical, etc.

Devices for depositing with or without mechanical contact with the substrate currently exist.

In the case of a deposit without contact, the principle is to sample a fluid, containing for example molecules of biological interest, from a sampling zone, and then to place the device above a depositing zone of a substrate, and to deliver a drop of the liquid without the device being in contact with the substrate. Such a device is described, for example, in U.S. Pat. No. 5,763,278. The device of this US patent comprises a piezoelectric element which compresses a chamber of small volume and thus ejects a drop of liquid onto substrates of microscope cover select type, or onto any other appropriate support, subsequently allowing analysis using an instrument for demonstrating interactions. Such devices have the advantage of not altering the surface on which the liquid must be deposited, but they are delicate to handle since, in general, the lower end of the device (where the drop to be deposited forms) is very fragile. Such devices also have the drawback of requiring quite large sample volumes. In addition, the complexity of their fabrication and calcination is quite restrictive, especially due to the nature of the materials used, in particular piezoelectric ceramics, which have a tendency to distort over time and with the voltages applied.

Among the depositing devices, certain use active fluidic means (pistons, valves, pumps) which have drawbacks both with regard to the complexity of fabrication and the risks of leakages, of blocking of tubing or of formation of bubbles.

As indicated above, devices also exist which operate by contact with the substrate. Some of these devices operate only by virtue of the phenomenon of capillary action. This is the case of the devices described in U.S. Pat. Nos. 5,770,151, 5,807,522 and 6,101,946, which are analyzed hereinafter.

U.S. Pat. No. 5,770,151 describes the device for sampling a liquid sample and depositing microdrops of this sample, comprising a hollow tube, one end of which is closed and the other end of which is open. The wall of the tube has, in the region of the open end, a longitudinal gap which promotes the sampling by capillary action of a small amount of liquid when the open end part is immersed in said liquid. Microdrops are subsequently deposited by capillary action, by placing the open end in contact successively with a plurality of spots on a solid surface.

U.S. Pat. No. 5,807,522 describes a device for sampling and depositing a liquid sample, comprising two spaced-apart, coextensive members so as to form an elongate capillary channel comprising lateral gaps and ending with a tip. By immersing the tip region in a liquid, a sample is retained in the capillary channel, and when the tip comes into contact with a solid support with sufficient impulsion, the meniscus at the base of the liquid sample is broken, which allows a microdrop of liquid sample to be deposited on the support.

U.S. Pat. No. 6,101,946 describes a pin for printing a microarray on a support, by depositing microdrops of a liquid sample. This pin comprises a point cut in the shape of a square-based pyramid, comprising a longitudinal gap forming two tips which are brought into closer proximity toward the end of the point. The fabrication of such pins requires high precision machining and is therefore very expensive.

All the devices described in the three patents analyzed above comprise a longitudinal gap with the aim of promoting the retention by capillary action of a relatively large amount of liquid. The production of these gaps complicates the fabrication of these devices and requires, in particular for the devices of U.S. Pat. Nos. 5,807,522 and 6,101,946, expensive machining; in addition, these capillary systems become blocked if the sample contains particles in suspension, and they are, moreover, quite difficult to decontaminate.

As will be seen hereinafter, the device of the invention can be used for depositing and fixing on a substrate, in particular by the electrochemical process, a ligand (biological substance or any molecule capable of interaction either with a reagent for analyzing or studying the properties of the ligand, or with a molecule of interest to be detected and/or to be quantified).

Patent FR 2 789 401 describes a process for depositing, in an array-like manner, a ligand and electrochemically fixing it on a conducting support. This process can be carried out in particular using a device comprising a conically shaped reservoir made of insulating material (polypropylene) containing a fluid reaction medium and an electrode. The fluid medium contains two types of electropolymerizable monomers, firstly pyrrole, and secondly pyrrole covalently bonded to a ligand. The end of the cone is open and has a small diameter. By bringing this end into contact with a conducting support subjected to an anode voltage relative to the electrode, it is possible to deposit, on the zone of contact with the substrate, a pyrrole polymer, some of the units of which are covalently bonded to the ligand. In such a device, the reservoir contains relatively large amounts of the fluid medium, and the end of the cone has no sampling function, and the reservoir must be filled by means of an active fluidic system (pumps, valves, etc.). In another embodiment, an electrode in the form of a wire which is immersed in a container containing the fluid reaction medium is used. When the electrode emerges from the fluid, it retains a drop of fluid at its end. The electrode is subsequently brought over the conducting support such that the drop comes into contact with the support while at the same time remaining in contact with the electrode. By applying an appropriate electrical voltage, the formation of a deposit of pyrrole polymer is obtained, as previously. Such a process requires a very precise control of the electrode-support distance. In fact, only the drop, and not the electrode, must come into contact with the support, since a short circuit would prevent the polymerization. It results therefrom that such a process, which is, moreover, relatively non-reproducible, is not suitable for industrial applications. Moreover, the volume of fluid transported by the pin is relatively nonreproducible and subject to drying.

Application WO 00/25925 describes a device for depositing drops of fluid on a substrate. This device comprises a cavity that can communicate with the outside via a capillary channel.

A subject of the present invention is in particular a device for sampling and transporting a fluid, including when the fluid sample which is the source of the fluid to be sampled is available only in very small amounts. This device, which can operate without active fluidic means such as pistons, pumps or valves, is very simple to fabricate and therefore has a relatively low cost price. It does not comprise any fragile elements and can thus be used over a long period of time.

A subject of the invention is a device for receiving, in particular for sampling and transporting, a fluid sample, which comprises an end part having at least one cavity which opens to the exterior via an opening, said cavity being equipped with a base, characterized in that said end part exhibits a first hydrophobic zone which is adjacent to the cavity opening and a second hydrophilic zone which is adjacent to the first zone and which at least partially covers the base of the cavity such that, when said end part is immersed in said fluid and then emerges therefrom, said cavity retains part of said fluid by means of capillary action.

The receiving device according to the invention is preferably designed so as to form an electrode, in particular a counterelectrode or a working electrode, in an electrochemical cell.

According to the present invention, the term "hydrophobic zone" is intended to mean a zone exhibiting an affinity for a fluid under consideration, in particular a liquid, that is weaker than the hydrophilic zone.

In particular embodiments, the device of the invention can also have the following characteristics, taken alone or, where appropriate, in combination:

- the hydrophobic nature is provided by a hydrophobic coating,
- said hydrophobic coating is deposited on said end part at least at the periphery of said opening (it being understood that this coating must not close up the opening),
- the hydrophobic zone extends into the cavity, optionally to the base thereof, without completely covering the base, and/or extends onto an outer wall of the device,
- the hydrophobic zone is made of an electrically insulating material,
- said hydrophobic coating is made of a material chosen, for example, from Teflon®, such as polytetrafluoroethylene (PTFE), polyvinylidene fluoride (PVDF), perfluoroalkoxy (PFA), homopolymers or copolymers of ethylene, of propylene or of isoprene, polyurethanes and epoxy resins, this list not being limiting,
- the hydrophilic zone is made of a metallic or nonmetallic, electrically conducting material,
- the end part comprises a body, which is made of an electrically conducting material and/or is coated with an electrically conducting material, the cavity being at least partially formed by this body,
- said electrically conducting material is chosen in particular from steel, titanium, platinum, gold, silver, graphite and carbon fibers, this list not being limiting,
- said cavity has at least one of the following characteristics:
  - it has a volume sufficient to retain a volume of fluid sample in the range of from 0.1 picoliter to 1 μl, and in particular from 1 to 50 nl,
  - it has a depth of 5 μm to 200 μm,
  - the cavity depth/opening diameter ratio can vary in the range of from 0.01 to 1, for example from 0.1 to 1,
  - the cavity can have a circular or polygonal transverse cross section,
  - the cavity can have a substantially cylindrical or conical shape, or have a cylindrical wall extended by means of a conical base,
- said device may or may not comprise a damping element for reducing the impacts that may affect said device when it comes into contact via its end part with a solid substrate in order to deposit said fluid sample thereon; said damping element is, for example, a spring,
- said device comprises a rod; the rod can be made of a material capable of elastic deformation, and can comprise at least one part in the shape of an S which plays the role of a damping element,
- said device comprises a rod that can slide in another part, in particular a cylinder designed to play the role of a damping element,
- the hydrophilic nature of the hydrophilic zone can be provided by a coating made of a hydrophilic material.

Preferably, the cavity for receiving the fluid sample opens directly to the exterior without the involvement of a capillary channel.

Thus, the cavity can be emptied and cleaned relatively easily.

According to a particular embodiment, the device of the invention comprises a rod equipped, on the outside or the inside, on the side of the end part, with a sleeve that has a protruding part which extends beyond the end of the rod. The cavity consists, in this case, of the protruding part of the inner wall of the sleeve and of the rod end face. The sleeve is, for example, made of a hydrophobic material. In particular, the rod can be made of a conducting material, and the sleeve of an insulating material, and if it is desired to use the device as an electrode, said rod end face can be polished and/or coated with a relatively unreactive metal, for example platinum or gold, so as to obtain a more stable electrode.

The protruding sleeve can also be made of a conducting material. In this case, at least the end of the protruding part is coated with a layer of hydrophobic material, preferably electrically insulating material. The hydrophobic coating can extend onto the outer wall of the conducting sleeve and, optionally, onto part of the protruding inner wall.

A subject of the invention is also a process for in particular sampling and transporting a fluid sample using a device as defined above. This process, which can operate without the use of active fluidic means, comprises the steps consisting in:

a) immersing the end part comprising said cavity in a container containing a fluid to be sampled, and then removing it therefrom, and
b) bringing said end part into contact with a solid substrate.

According to particular embodiments:

- the end part is subsequently moved away from the substrate, so as to leave, as a deposit on the substrate, a drop of the fluid sample,
- if desired, steps a) and b) are repeated as many times as necessary for depositing a plurality of identical or different fluid samples on the solid substrate, so as to form, on said substrate, deposits in the form of a matrix array. When the samples are different, a rinsing-drying operation will be necessary.

This process can be used in particular with a fluid sample which contains biological molecules or substances to be deposited and/or to be immobilized on the substrate. It can also be used for transporting a fluid to another fluid solution, so as to produce a dilution, for example.

The process of the invention also makes it possible to use the receiving device as an electrode. For this, the device comprises a body made of a conducting material, and said end part is equipped with an insulating and hydrophobic coating or sleeve which, of course, does not close up the cavity opening. The substrate is made of a conducting material or contains one or more conducting zones and, after said step of bringing into contact, the assembly forms an electrochemical cell comprising at least two independent electrodes. One or more additional electrode(s) can be added either to the device, or to the substrate.

The fluid can comprise an electrolyte and, optionally, other compounds in suspension.

The process can comprise the step consisting in carrying out an electrochemical-type analysis of the solution or suspension sampled.

The process can comprise the step consisting in using the abovementioned assembly as an electrochemical cell and passing an electric current, or simply measuring a potential difference, between said end part and said substrate or between the end part and a conducting zone of the substrate, by means of the sample, containing an electrolyte, which is in contact both with the conducting body and with the substrate. Using a galvanostatic or potentiostatic assembly, it is possible to determine the current and potential characteristics of the sampled fluid sample to be analyzed or of the substrate, without any notable modification of the composition of the sample, since the concentrations of the electroactive substances dissolved are virtually unmodified by the measurements carried out.

Using, for example, the device of the invention as a working electrode and the conducting support, in particular a metal strip, as a counterelectrode, the cavity of the device constitutes an electrolyte microcell for in particular studying the reactions which occur at the working electrode. Such a device makes it possible to always have the same distance between the working electrode and the counterelectrode.

It is also possible to use the process of the invention for immobilizing one or more biological molecules or substances on the conducting substrate according to an electrochemical method of electrodeposition. In this case, the substrate constitutes the working electrode and the end of the receiving device serves as a counterelectrode.

Such a process of electrodeposition can be carried out in particular when the fluid contains a monomer that is electropolymerizable, for example by anodic oxidation. The electric current is then passed between the body and the substrate, bringing said substrate to a potential required for polymer formation. Thus, the end of the sampling device, made of a conducting material, plays the role of a counterelectrode, such that the monomer will polymerize in contact with the conducting substrate, by anodic oxidation, and form a point deposit, also called spot, that adheres on said substrate. Such a process therefore makes it possible to produce microspots of polymer, optionally arranged as an array, on a conducting surface.

A subject of the invention is also a process for forming an electrochemical cell, the process comprising the following steps:

- providing a receiving device which comprises an end part having at least one cavity which opens to the exterior via an opening, said cavity being equipped with a base, this end part exhibiting a first electrically insulating hydrophobic zone which is adjacent to the cavity opening and a second electrically conducting hydrophilic zone which is adjacent to the first zone and which at least partially covers the base of the cavity,
- providing a receiving surface, in particular a substrate, having at least one conducting zone,
- sampling a fluid sample by means of the receiving device,
- bringing the end part of the receiving device into contact with the conducting zone of the receiving surface, the first hydrophobic zone being designed so as to electrically insulate the second conducting hydrophilic zone from the conducting zone of the receiving surface.

A subject of the invention is also a process comprising the following steps:

- providing a receiving device which comprises an end part having at least one cavity which opens to the exterior via an opening, said cavity being equipped with a base, this end part exhibiting a first electrically insulating hydrophobic zone which is adjacent to the cavity opening and a second electrically conducting hydrophilic zone which is adjacent to the first zone and which at least partially covers the base of the cavity,
- providing a receiving surface, in particular a substrate, having at least one conducting zone,
- sampling a fluid sample by means of the receiving device,
- bringing the end part of the receiving device into contact with the conducting zone of the receiving surface, the first hydrophobic zone being designed so as to electrically insulate the second conducting hydrophilic zone from the conducting zone of the receiving surface,
- establishing an electric current between the hydrophilic zone of the receiving device and the conducting zone of the substrate or measuring an electrical parameter, for example a potential difference, between the conducting zone of the receiving device and the conducting zone of the receiving support.

The process can comprise the following step:

- establishing an electric current, in particular a pulsed current, between the hydrophilic zone of the receiving device and the conducting zone of the substrate in order to polymerize a substance contained in the cavity of the receiving device.

The process can, as a variant, comprise the following steps:

- measuring an electrical parameter, in particular a potential difference, between the conducting zone of the receiving device and the conducting surface, for example a steel sheet,
- repeating the preceding step in order to carry out, for the conducting surface, a mapping relating to a physical or chemical characteristic, for example an oxidation state, using the measurements obtained.

Figure 6:
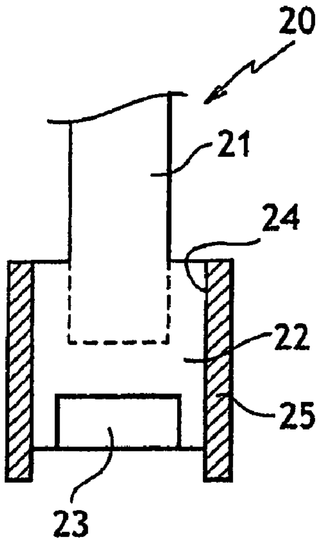
Figure 7:
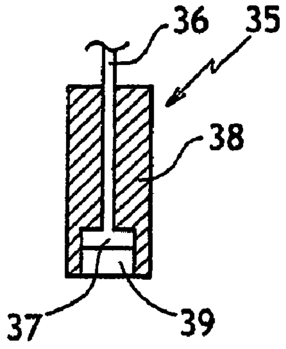
Figure 8:
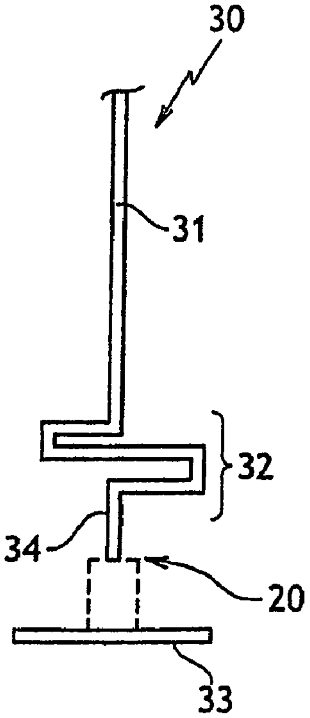
Figure 9:
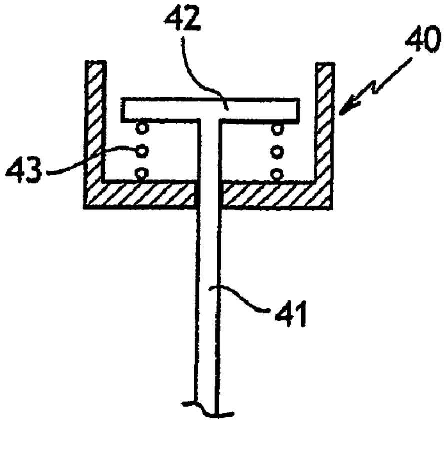
Figure 10:
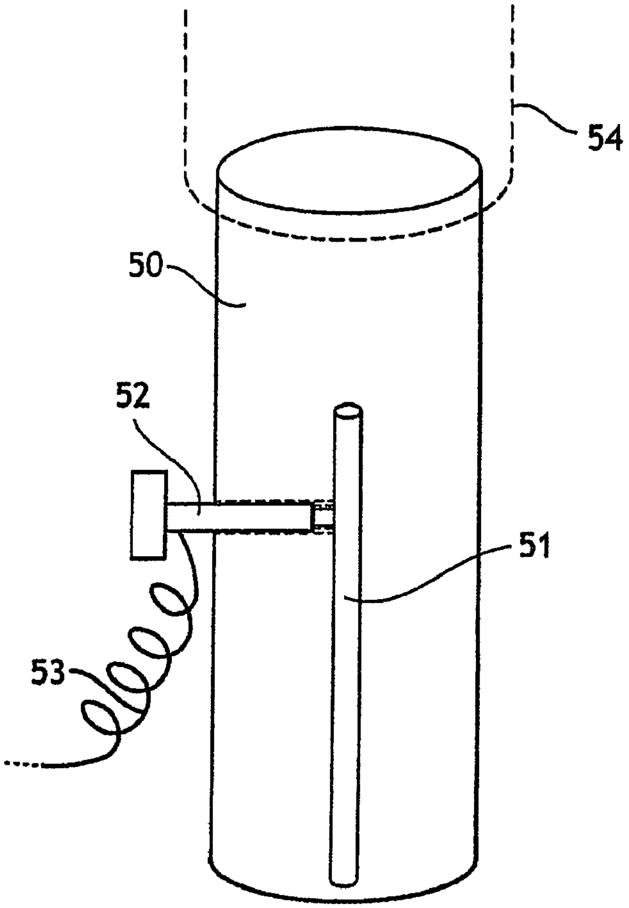
Figure 11:
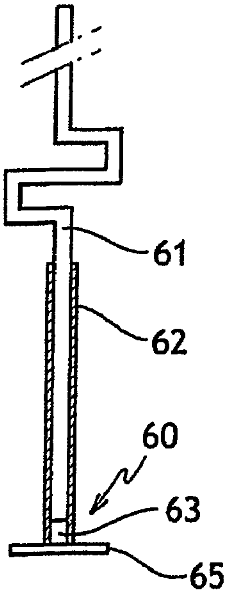
Figure 12:
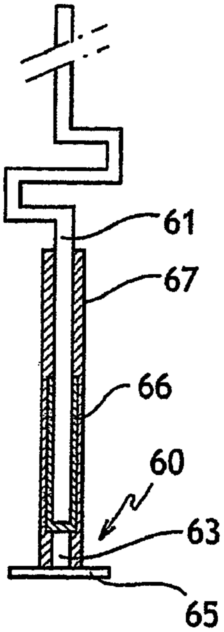
Figure 13:
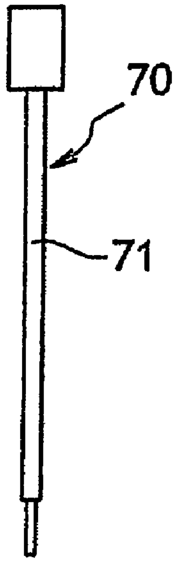
Figure 14:
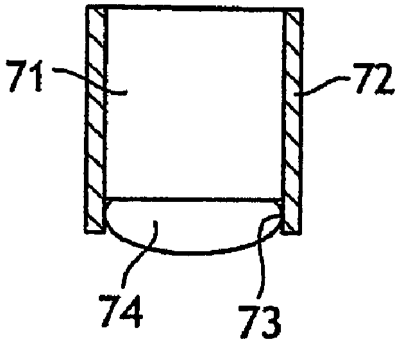
Figure 15:
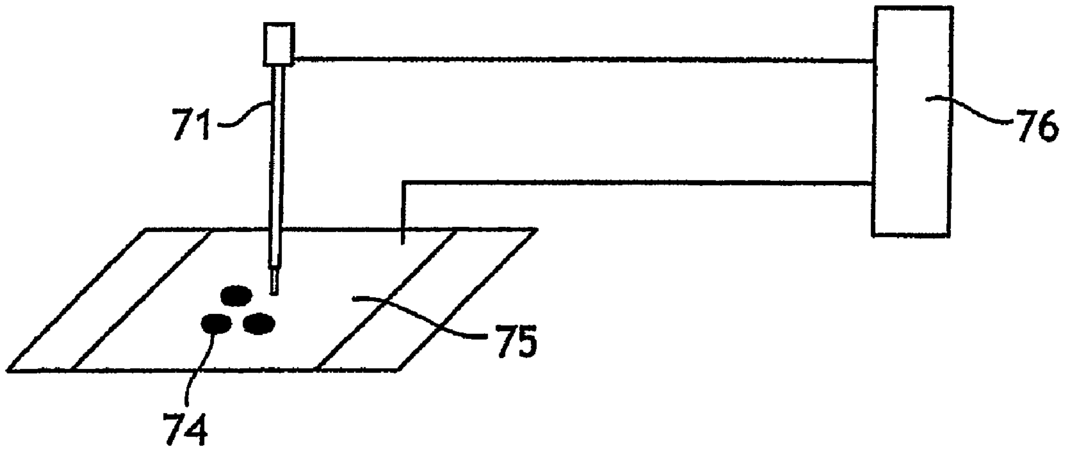

Particular embodiments of the invention will now be described in greater detail, by way of illustration, with reference being made to the attached drawings in which:

FIGS. 1 to 7 represent, diagrammatically and partially, particular embodiments of the end part of the device of the invention, FIGS. 8 and 9 represent, diagrammatically and partially, embodiments of a receiving device with a damper, FIG. 10 represents, diagrammatically and partially, a support of a counterelectrode in accordance with the invention, FIGS. 11 and 12 represent, diagrammatically and partially, an indicating electrode in accordance with two examples of implementation of the invention, and FIGS. 13 to 15 illustrate another example of implementation of the invention.

Represented in FIG. 1, very diagrammatically, is a receiving device 1 in accordance with the invention.

The device 1 comprises a rod 2, an end part 2' of which is provided with a receiving cavity 3.

In the example considered, the cavity 3 is in the shape of a cylinder having an axis X parallel to the rod 2, with an inner wall 4 and a base 5.

The rod 2 has, at its end, a section 6 covered with a hydrophobic coating 8.

In the example considered, the rod 2 is made of a conducting material exhibiting hydrophilic properties, it being possible for this conducting material to be, for example, gold, platinum or a stainless steel of the 316L stainless steel type.

The section 6 extends to the periphery of the opening 7 of the cavity 3.

In the example of FIG. 1, the coating 8 extends only over the section 6, without going over into the cavity 3, nor onto the outer wall 10 of the rod 2.

Figure 2:
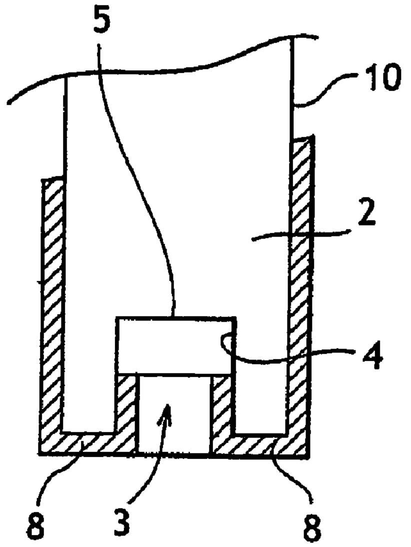

As a variant, the coating 8 can extend, as illustrated in FIG. 2, into the cavity 3, partially covering the inner wall 4.

This coating 8 may or may not reach the base 5.

The coating 8 can also extend onto the outer wall 10 of the rod 2.

In the examples which have just been described, the receiving cavity 3 is produced in a hollowing-out of the rod itself.

Figure 3:
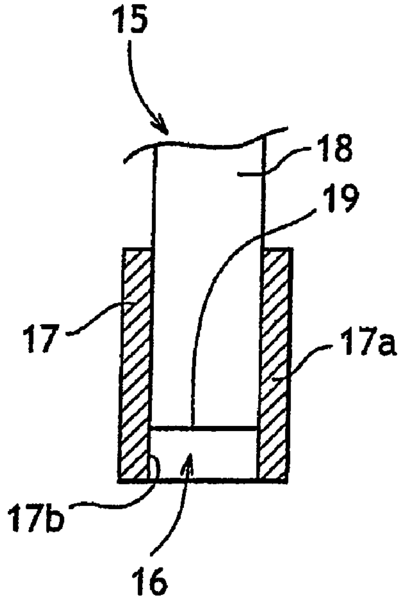

Represented in FIG. 3 is a receiving device 15 in accordance with another example of implementation of the invention, in which the receiving cavity 16 is formed by a sleeve 17 fitted at one end of a rod 18.

The cavity 16 has a base defined by the section 19 of the rod 18.

The sleeve 17 comprises a first part 17*a* engaged on the rod 18 and a second part 17*b* protruding from the section 19.

The sleeve 17 is made of a hydrophobic material, consisting, for example, of a heat-shrinkable sheath made of plastic.

Figure 4:
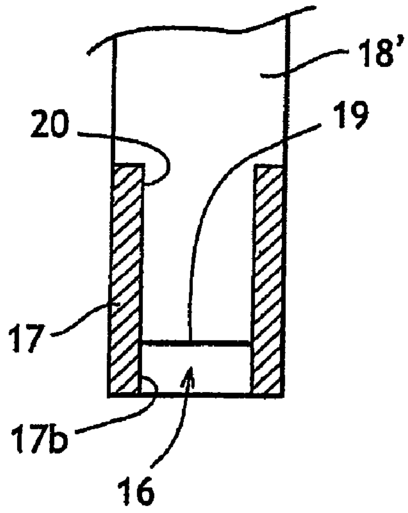

In the example of implementation illustrated in FIG. 4, the rod 18' comprises an annular necking 20 on which the sleeve 17 is fitted.

Figure 5:
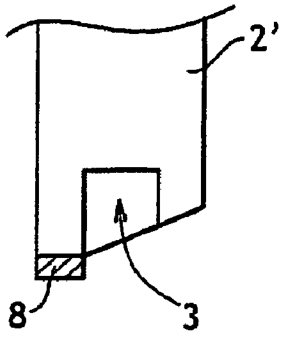

Represented in FIG. 5 is a receiving device that differs from that described with reference to FIG. 1 by virtue of the fact that the end of the rod 2' is at least partially beveled, it being, for example, semi-beveled or completely beveled.

In the example of implementation illustrated in FIG. 6, the receiving device 20 comprises a rod 21 at one end of which is attached a metal insert 22 comprising a receiving cavity 23.

The insert 22 comprises a cylindrical outer wall 24 covered with a hydrophobic coating 25.

Represented in FIG. 7 is a receiving device 35 with a metal rod 36 having at one end a head 37, part of the rod 36 and this head 37 being embedded in a coating made of a hydrophobic material 38.

This coating 38 comprises, at right angles with the head 37, a cavity 39 for receiving a fluid sample.

Represented in FIG. 8 is a device 30 in accordance with the invention, comprising a metal rod 31, which has a part 32 folded in the shape of an S, designed so as to define an elastically deformable zone forming a damper.

This damper can thus be produced in a particularly simple manner and makes it possible to damp impacts along a direction perpendicular to the plane of the substrate 33. In the example considered, the substrate 33 comprises a gold plate.

The lower end 34 of the rod 31 defines a receiving device 20 described with reference to FIG. 6.

In the example of implementation illustrated in FIG. 9, the receiving device is attached to a rod 41 which has, at an upper end, a head 42 which fits into a housing of a support 40.

This head 42 is returned to its starting position by means of a spring 43 distinct from the rod 41.

Thus, the rod 41 can be free of a part folded in the shape of an S such as that described with reference to FIG. 8.

The spring 43 can be replaced by any other element with an elastic return, such as an elastomeric material, for example.

This support 40 can be attached to a manipulating arm of an automated device for moving the rod along horizontal and vertical directions.

Such an automated device can be designed so as to be able to actuate a plurality of receiving devices.

Using an automated 3-axis device, it is possible to deposit drops on a substrate according to a matrix array.

A typical method of use consists in bringing the receiving device over the sampling zone, and moving the rod vertically downward until its end is immersed in the fluid to be transferred. This is followed by a horizontal movement until it is plumb with the depositing zone on a substrate, and a vertical descent until there is contact with the substrate, and deposition of a microdrop by capillary action. Next, the device is raised back up vertically, and then moved to a zone for cleaning the end, for example by water jet, and then air jet for drying. The operations can then be repeated with the same fluid sample or another fluid sample.

When the hydrophobic coating or sleeve is made of an insulating material, it is possible to use the device of the invention as an electrode, the cavity 23 playing the role of an electrochemical microcell.

Various applications of the invention will now be described in greater detail hereinafter.

EXAMPLE 1

Production of Protein Chips by Electrochemical Deposition

This involves producing a chip comprising 60 spots of 6 different molecules, 10 copies of each being immobilized; each spot is arranged on a virtual square grid pattern of 8×8 spots, with a gap of 700 μm between the center of each spot and on a total surface area of 5×5 $mm^2$. Four zones will not be functionalized with biological species, the substrate will remain “bare”.

The six different molecules are antibodies: an anti-hCG antibody (Sigma), an anti-peptide mAb 11E12 (Sanofi Diagnostics Pasteur), an anti-HSA antibody (Sigma), an anti-avidin antibody (Sigma), an anti-rabbit IgG antibody (Sigma) and an anti-BSA antibody (Sigma).

The final objective of the experiment is to observe the interactions in parallel, in real time and without a label, of these antibodies with the molecules against which they are directed, injected successively in contact with the chip, by means of the Surface Plasmon Resonance imaging technique such as that described in application WO 02/48689. All these molecules are coupled beforehand to pyrrole monomers on their NH2d bond. After this, each protein coupled to one or more pyrrole molecules, at a concentration of 10 μM in a reaction medium consisting of 50 mM $NaH_2PO_4$ (Sigma)+50 mM NaCl (Merck), at a pH of 6.8, is placed at the bottom of one of the wells of a conical-bottom 96-well microplate. A few microliters of product, typically less than or equal to 5 μl, are sufficient to make it possible to carry out several tens of deposits per species.

The substrates used in this example are prismatic substrates, with a base of 12.5×25 $mm^2$ and a height of 9 mm (made of BK7 or SF11 glass), onto which have been deposited a layer of chromium of approximately 20 angstroms, which serves as an attachment layer, and a layer of gold of approximately 500 angstroms (depositions carried out by evaporation under vacuum). Substrates of these types are particularly suitable for measurements made by Surface Plasmon Resonance.

The layer of gold is then connected to an EGG 273-type potentiostat forming a working electrode outlet. As regards the counterelectrode part of this electrochemical cell, the procedure is as follows:

a receiving device, for example the receiving device 30 described with reference to FIG. 8, is inserted into a stainless steel cylinder 50 with a hollowing-out 51 receiving the device 30, as illustrated in FIG. 10, the cavity 23 has a circular cross section, with an internal diameter of 250 μm; the external diameter of the insulating sleeve 25 is 450 μm and the depth of the cavity 23 is 50 μm, which corresponds to a total cavity volume of approximately 2.5 nl, to maintain the device 30 in the hollowing-out 51, a stainless steel blocking screw 52 is used, which also makes it possible to establish the electrical connection between the conducting part of the cavity 23 of the device 30 and the counterelectrode outlet, via an electrical wire 53, the cylinder 50 can be maintained in the vertical position either in a chuck, or can be installed on a manipulating arm 54, represented very diagrammatically as dashed lines in FIG. 10, for example of an industrial automated device with 3-axis movement, called GENESIS sold by the company TECAN for example, by virtue of threading cuts on the upper part of this cylinder; it is noted that a reference electrode is of no use in this present case, the latter being directly connected to the counterelectrode.

The manipulating arm 54 holding the cylinder 50 is placed vertically to the well containing the anti-hCG antibody.

The manipulating arm 54 descends into the well such that the cavity 23 of the device 30 is completely immersed in the solution.

A mechanical contact at the bottom of the well is possible and does not impair the functionality of the device. Some of the solution, a few nl in this case, penetrates into the cavity by capillary action.

The manipulating arm 54 is moved back up vertically and is displaced above the depositing zone on the gilded prismatic substrate, and more particularly above one of the predetermined zones of the array. The manipulating arm 54 then descends until mechanical contact is obtained between the device 30 and the substrate.

The electrical contact, which is made between the conducting base of the cavity 23 and the substrate via the conducting reaction medium, does not necessarily require the receiving device 30 to be in mechanical contact with the substrate. It is, however, preferable to effect such a mechanical contact.

Once the arm 54 is immobilized, a potential difference of +2.4 V is established for 250 ms between the counterelectrode and the working electrode by virtue of the EGG 273 potentiostat. There is then formation of a thin film of polypyrrole on the substrate, by which the biomolecules, i.e. the anti-hCG antibodies, are attached to the gold-coated prismatic support.

The manipulating arm 54 can then be moved back up and put back into the preceding well in order to take another sample; the rinsing and the drying of the device are not essential in this case since the same product is sampled several times.

Once the ten spots have been formed according to the same process, the manipulating arm 54 is moved to be vertical to a well of the microplate filled with ultrapure water. The arm 54 is then moved in and out of this well three times so as to correctly rinse the device 30, which, without distinction, may or may not come into contact with the bottom of the well without impairing the future functionality thereof. The manipulating arm 54 is then brought into contact with an absorbent paper, for example an optical paper sold by the company Kodak. This drying operation is carried out three times, at three different places on the absorbent paper.

After this drying phase, the manipulating arm 54 is controlled with a view to sampling a second antibody, an anti-HSA, for example, according to the sequence described above, so as to deposit the 10 spots electrochemically. The process is carried out in this way for the other four species.

Similarly, 96 spots of different species can be deposited, by performing a cleaning-rinsing-drying phase at the end of each electrodeposition.

EXAMPLE 2

Production of a 384-Spot Chip Exhibiting DNA Sequences Relevant for Studying Cystic Fibrosis (Deposition by Passive Adsorption)

In this example, the substrates are microscope slides (75×25×1 $mm^3$, sold under the name ESCO by the company VWR International) on which are deposited beforehand a layer of chromium of approximately 20 angstroms and a layer of gold of approximately 500 angstroms (depositions carried out by vacuum evaporation).

This slide is functionalized with a coating which promotes the immobilization of biomolecules by electrostatic interactions. It is a monolayer of 11-mercaptoundecanoic acid (MUA) deposited onto the gold and then a monolayer of polyethyleneimine (PEI) (method described by Bassil et al., Sensors and Actuators B94 (2003) 313-324). This surface is then brought into contact with a solution of extravidin (Sigma) at 0.2 g/l in PBS (Sigma) for 30 minutes before being rinsed with water. The extravidin then attaches to the PEI by means of the electrostatic interactions.

The substrate is placed in the working zone of a 3-axis automated device, for example that sold under the name Q-Array by the company Genetix, which already has predetermined positions for microscope slides of this format and also for standard microplates with a support comprising an integrated damping device, the damping occurring under its own weight, and into which the device 40 described, for example, with reference to FIG. 9 is inserted.

The dimensions of the device are, in this case, as follows: the internal diameter of the sample-receiving cavity is 100 μm, the depth thereof is 50 μm and the external insulating PTFE sleeve diameter is 300 μm.

Several oligonucleotide sequences (300 different sequences in total), functionalized with a biotin in the 5' position, are placed separately in the wells of a 384-well microplate, in a PBS buffer, in the presence of 1.5 M of betaine so as to prevent the species from drying out too rapidly on the chip. The concentration of the sequences is 1 μM in each of the wells. These sequences were chosen so as to determine with certainty the type of mutation implicated in cystic fibrosis. Three copies of each species are deposited, distributed randomly over a virtual rectangular array composed of 16×64 points 400 μm apart (1024 measuring points in all).

The arm which carries the device previously described moves the rod down into one of the wells of the microplate. The product is sampled by capillary action when the rod is immersed in the liquid containing the oligonucleotides.

The manipulating arm 54 then moves back up and is positioned above one of the points of the array. The arm descends vertically and, when there is mechanical contact between the substrate and the device, the latter deposits on the substrate a part of the volume sampled in the form of a microdrop having a volume of approximately 1 to 2 nl.

The arm 54 then returns above the same well as previously, and carries out the previous cycle a further two times in order to produce two other spots of the same biological species.

Once the three spots of each of the species have been spotted, the arm again moves back up and is placed vertically to a fountain spraying ultrapure water on the rod, so as to remove the fluid still present in the cavity or on the outer wall of the device.

The arm subsequently places the device over a drying element producing, for example, a stream of hot dry air and remains there for a few tens of seconds.

The device is then ready to sample a further product from another well, until all the types of oligonucleotide sequences have been sampled and deposited.

EXAMPLE 3

Fluorescence Techniques

Finally, the analysis of the chip can be carried out by fluorescence techniques. The aim is to compare the expression profile of an affected patient with respect to a normal patient. To do this, the DNA of a normal patient is labeled beforehand with a fluorescent label (Cy3, for example, Sigma) and that of an affected patient is labeled with another fluorescent label (Cy5, for example, Sigma). The sera of the two patients are mixed and this mixture is brought into contact with the functionalized chip. The products are left in contact for 30 minutes at 37° C. The chip is then rinsed and inserted into a fluorescence reader, for example the Genechip™ Scanner 3000. The analysis of the fluorescence of the two labels on each of the spots, corresponding to the various oligonucleotide sequences, then makes it possible to determine which are the genotypes overexpressed or underexpressed in the affected patient compared with the normal patient.

EXAMPLE 4

Parallel Deposition

The invention can be implemented for parallel deposition, with or without electrochemistry, with 8 rods which sample, from a 1536-well plate, around 8 different substrates (for example, 8 rods installed on an automated device called GENESIS sold by the company TECAN).

EXAMPLE 5

Use of the Receiving Device as an Indicating Electrode or Working Electrode

In the following two examples, the rod is used as a working electrode in a two-electrode electrochemical microcell. This type of device makes it possible, for example, to characterize molecules in the reduced or oxidized state or to study the synthesis of polymers by electrochemistry.

EXAMPLE 6

Use in Galvanostatic Mode

Using an electrode with a very small surface area, of the order of 1 $mm^2$, which is called an indicating electrode, it is possible to determine current-potential characteristics while at the same time conserving the system virtually without modification of composition, i.e. without substantially modifying the concentrations of the electroactive substances dissolved in the electrolyte, despite the passage of the current.

A solid electrode 60 illustrated in FIG. 11 is produced by inserting a rod 61 made of platinum, gold, silver, graphite or stainless steel, with a diameter of between 0.5 mm and 2 mm, into an insulating sheath 62 made of insulating glass, polyethylene or Teflon® for example, and releasing the straight section of the rod so as to bring it into contact with the solution. A planar disk electrode is thus obtained. The end of the rod in contact with the solution can be polished with, for example, diamond paste.

The cavity 63, having a continuous wall, makes it possible to create an electrochemical microcell filled, by capillary action, with the sample to be analyzed.

The working electrode 60 formed by the rod 61 is connected to the outlet of a working electrode of a potentiostat. This connection can be made directly on the rod or on a metal piece into which the rod fits, and designed so as to adapt to an automated device.

The counterelectrode 65 may be a sheet of platinum, a gold strip, a plastic support coated with ITO (indium tin oxide), or a silicon plate, for example.

The reaction medium may be an ionic solution based on $Li^+$, $ClO_4^-$ ions or PBS for example, containing the chemical species to be analyzed.

The end of the electrode 60 is brought into contact with the counterelectrode 61 and a current of a few tens of microamps is applied. The voltage is then measured.

This device can, similarly, be used in the potentiostatic mode.

In this case, a voltage is applied between the two electrodes and the current generated by this voltage is analyzed.

As previously, the rod is used as a working electrode, a gold strip is used as a counterelectrode and the cavity is used as an electrochemical microcell. The reactions which take place at the working electrode consisting of the rod are then studied.

This device makes it possible to always have the same distance between the working electrode and the counterelectrode.

The sleeve 62 can either be of insulating nature, or of conducting nature and coated with a layer 66 of an insulating material 67, for example a rigid insulating Teflon®, as illustrated in FIG. 12.

EXAMPLE 7

Use of the Rod as an Auxiliary Electrode (Counterelectrode)

In this configuration, the function of the rod will be to serve as a counterelectrode and a microcell. This makes it possible to produce microspots of polymer on a metal surface of a few hundred μm in diameter.

The rod is made of stainless steel or of stainless steel coated with a metal, for instance platinum, gold or silver. The sleeve is made of stainless steel possibly coated with a metal as regards its internal part and coated with Teflon® on its external part. The sleeve can also consist of an insulating material.

A voltage of approximately 2 V is applied using a potentiostat or a voltage generator for example, between the rod and the gold strip which serves, in the example under consideration, as a working electrode.

The cavity is filled with an ionic solution containing, for example, pyrrole and the rod then comes into contact with a glass slide coated with chromium and gold thus forming an electrochemical microcell. A potential is then applied between the two electrodes. The current and the charge for synthesis of the polymer (polypyrrole) thus formed, on the surface of the gold-coated slide, are recorded. Several spots can thus be produced on the same surface.

The damping system makes it possible not to damage the rod and the gold strip. The gold strip is also protected by the layer of "soft" Teflon® at the end of the rod.

Coating the inside of the cavity with a metal such as platinum can make it possible to improve the electrochemical synthesis of the polymer.

EXAMPLE 8

Synthesis of Deposits

Use is, for example, made of a receiving device 70 comprising a rod 71 made of 304L stainless steel (surgical quality) and a sleeve 72 made of Teflon®, as illustrated in FIGS. 13 and 14.

The Teflon® sleeve 72 protrudes below the end of the rod 71 so as to define a cavity 73.

This cavity 73 has, for example, a diameter of approximately 260 μm and a depth of approximately 100 μm and makes it possible to receive a solution to be polymerized 74.

The stainless steel rod 71 serves as a counterelectrode.

The solution to be polymerized 74 is deposited on a substrate 75 coated with a layer of gold serving as a working electrode, as illustrated in FIG. 15.

The rod 71 and the substrate 75 are connected to a potentiostat 76.

The synthesis of deposits is carried out by the electrospotting method by applying an electric pulse through the rod 71.

The Teflon® sleeve 72 makes it possible to insulate the counterelectrode from the working electrode, the cavity 73 forming an electrochemical cell in which the electric pulse triggers the polymerization of the solution.

The receiving device 70 also makes it possible to capture a drop of approximately 50 nl by immersing said receiving device in the solution to be polymerized, and to ensure its transport to above the working electrode.

The rod 71 is placed on a supporting structure (not represented) in which it can slide vertically under the action of its own weight. The movements are provided by motorized jackscrews controlled by an automated device.

The conditions for the electrospotting (potential, time) are optimized so as to obtain deposits of pyrrole and of pyrrole ODN. During the polymerization, the charge delivered by the potentiostat 76 is recorded in the form of a chronoamperogram.

Once the deposits have been made, a hybridization is carried out with a labeled complementary ODN in order to demonstrate the spots containing ODNs. The detection is in this case carried out using a fluorescence microscope equipped with a black and white CCD camera for image acquisition. The fluorescence intensities are expressed as levels of gray.

EXAMPLE 9

Process for Carrying Out Redox Mapping of a Conducting Surface

This example concerns the use of a receiving device according to the invention for characterizing a metal surface, such as a steel sheet, and performing two-dimensional mapping of the oxidation state thereof.

The receiving device used in this case is substantially the same as that used in the preceding example.

A layer of silver is added by electrochemical reaction at its hydrophilic end, i.e. on the cavity base.

The electrolyte used for measuring the residual potential between the silver-coated electrode and the metal sheet is, for example, 100 mM KCl. The receiving device and the electrolyte are deposited on a first point of the surface to be mapped, and the value of the potential difference between the metal sheet and the receiving device is recorded. The receiving device is then rinsed, dried and filled again with electrolyte, followed by deposition at a second point of the surface to be mapped.

This process makes it possible to detect any points of oxidation of the steel. The various treatments of the metal sheet can therefore be readily studied and compared.

The invention claimed is:

1. An electrochemical cell comprising a device for receiving a fluid sample, which is configured so as to form an electrode that is accessible to be electrically connected to an electrical generator, the device comprising an end part having at least one cavity which opens to an exterior via an opening, said cavity being equipped with a base, wherein said end part exhibits a first electrically insulating hydrophobic zone which is adjacent to the cavity opening and a second electrically conducting hydrophilic zone which is adjacent to said first electrically insulating hydrophobic zone and which at least partially covers the base of the cavity such that, when said end part is immersed in a fluid and then emerges from the fluid, said cavity retains part of said fluid by means of capillary action, a cavity depth/opening diameter ratio varying in a range from 0.01 to 1.

2. The electrochemical cell as claimed in claim 1, wherein the first electrically insulating hydrophobic zone is provided with a hydrophobic coating, said hydrophobic coating being deposited on said end part, at least at a periphery of said opening.

3. The electrochemical cell as claimed in claim 2, wherein the first electrically insulating hydrophobic zone extends at least one of (1) into the cavity, without completely covering the base and (2) onto an outer wall of the device.

4. The electrochemical cell as claimed in claim 1, wherein the second electrically conducting hydrophilic zone is made of a metallic or nonmetallic, electrically conducting material.

5. The electrochemical cell as claimed in claim 1, wherein the end part comprises a body, which is at least one of made of an electrically conducting material and coated with a coating of an electrically conducting material, and the cavity is at least partially formed by the body.

6. The electrochemical cell as claimed in claim 1, wherein the cavity has at least one of the following characteristics:

said cavity has a volume sufficient to retain a volume of fluid sample in a range from 0.1 picoliter to 1 μl, and said cavity has a depth of 5 μm to 200 μm.

7. The electrochemical cell as claimed in claim 1, wherein said device comprises a rod equipped, on a side of the end part, with a sleeve that has a protruding part which extends beyond an end of the rod.

8. The electrochemical cell as claimed in claim 7, wherein said sleeve is made of a hydrophobic material.

9. The electrochemical cell as claimed in claim 7, wherein said sleeve is made of an electrically conducting material, and at least an end of the protruding part is coated with a layer of hydrophobic material.

10. The electrochemical cell as claimed in claim 1, further comprising a damping element for reducing impacts that may affect said device when the end part of the device comes into contact with a depositing zone on a solid substrate.

11. The electrochemical cell as claimed in claim 10, wherein said damping element is a spring.

12. The electrochemical cell as claimed in claim 1, wherein said device comprises a rod.

13. The electrochemical cell as claimed in claim 12, wherein said rod is made of a material capable of elastic deformation.

14. The electrochemical cell as claimed in claim 13, wherein said rod comprises at least one part in a shape of an S which plays a role of a damping element.

15. The electrochemical cell as claimed in claim 11, wherein said device further comprises a rod, and said rod slides in another part in order to dampen the contact with the solid substrate.

16. A process for sampling and transporting a fluid sample using an electrochemical cell, the process comprising:

providing a receiving device for receiving a fluid sample, which is configured so as to form an electrode that is accessible to be electrically connected to an electrical generator, the receiving device comprising, an end part having at least one cavity which opens to an exterior via an opening, said cavity being equipped with a base, wherein said end part exhibits a first electrically insulating hydrophobic zone which is adjacent to the cavity opening and a second electrically conducting hydrophilic zone which is adjacent to the first electrically insulating hydrophobic zone and which at least partially covers the base of the cavity such that, when said end part is immersed in a fluid and then emerges from the fluid, said cavity retains part of said fluid by means of capillary action, a cavity depth/opening diameter ratio varying in a range from 0.01 to 1;

immersing the end part comprising said cavity in a container containing the fluid to be sampled, and then removing the end part from the container; and bringing said end part into contact with a solid substrate.

17. The process as claimed in claim 16, wherein the end part is subsequently moved away from the solid substrate, so as to leave, as a deposit on the solid substrate, a drop of the fluid sample.

18. The process as claimed in claim 16, in which steps a) and b) are repeated as many times as necessary for depositing a plurality of identical or different fluid samples on the solid substrate, so as to form, on said solid substrate, deposits in the form of a matrix array.

19. The process as claimed in claim 16, wherein the fluid sample contains biological molecules or substances to be deposited on the solid substrate.

20. The process as claimed in claim 16, wherein said fluid sample contains an electrolyte in suspension.

21. The process as claimed in claim 20, wherein an electrochemical-type analysis of the suspension sampled is carried out.

22. The process as claimed in claim 20, wherein a measurement of potential between said end part and said solid substrate, by means of the sample, is carried out.

23. The process as claimed in claim 20, wherein the device comprises a body made of a conducting material, and said end part is equipped with an insulating coating, and said solid substrate is made of a conducting material, and in which, after step b), an electric current is passed between said end part and said solid substrate, by means of the fluid sample.

24. The process as claimed in claim 21, wherein said fluid sample contains a monomer that is electropolymerizable by oxidation, and an electric current is passed between a body of the device and the solid substrate, bringing said solid substrate to a potential required for polymer formation.

25. A process for forming an electrochemical cell, the process comprising the following steps:

providing a receiving device which comprises an end part having at least one cavity which opens to an exterior via an opening, said cavity being equipped with a base, the end part exhibiting a first electrically insulating hydrophobic zone which is adjacent to the cavity opening and a second electrically conducting hydrophilic zone which is adjacent to the first electrically insulating hydrophobic zone and which at least partially covers the base of the cavity, a cavity depth/opening diameter ratio varying in a range from 0.01 to 1;

providing a receiving surface having at least one conducting zone;

sampling a fluid sample by means of the receiving device; and bringing the end part of the receiving device into contact with the at least one conducting zone of the receiving surface, the first electrically insulating hydrophobic zone being configured so as to electrically insulate the second electrically conducting hydrophilic zone from the at least one conducting zone of the receiving surface.

26. A process for forming an electrochemical cell, the process comprising the following steps:

providing a receiving device which comprises an end part having at least one cavity which opens to an exterior via an opening, said cavity being equipped with a base, the end part exhibiting a first electrically insulating hydrophobic zone which is adjacent to the cavity opening and a second electrically conducting hydrophilic zone which is adjacent to the first electrically insulating hydrophobic zone and which at least partially covers the base of the cavity, a cavity depth/opening diameter ratio varying in a range from 0.01 to 1, providing a receiving surface having at least one conducting zone, sampling a fluid sample by means of the receiving device, bringing the end part of the receiving device into contact with the at least one conducting zone of the receiving surface, the first electrically insulating hydrophobic zone being configured so as to electrically insulate the second electrically conducting hydrophilic zone from the at least one conducting zone of the receiving surface, establishing an electric current between the second electrically conducting hydrophilic zone of the receiving device and the at least one conducting zone of the receiving surface or measuring an electrical parameter between the second electrically conducting hydrophilic zone of the receiving device and the at least one conducting zone of the receiving surface.

27. The process as claimed in claim 26, comprising the following step:

establishing an electric current between the second electrically conducting hydrophilic zone of the receiving device and the at least one conducting zone of the receiving surface in order to polymerize a substance contained in the cavity of the receiving device.

28. The process as claimed in claim 26, further comprising the following steps:

measuring an electrical parameter between the second electrically conducting hydrophilic zone of the receiving device and the at least one conducting zone of the receiving surface;

repeating the preceding step in order to carry out, for the at least one conducting zone of the receiving surface, a mapping relating to a physical or chemical characteristic, for example an oxidation state, using the measurements obtained.

29. The electrochemical cell as claimed in claim 4, wherein the electrically conducting material is chosen from steel, titanium, platinum, gold, silver, graphite and carbon fibers.

30. The electrochemical cell as claimed in claim 6, wherein the cavity has a volume sufficient to retain a volume of fluid sample specifically in the range from 1 to 50 nl.

31. The electrochemical cell as claimed in claim 6, wherein the cavity has a circular or polygonal transverse cross section.

32. The electrochemical cell as claimed in claim 6, wherein the cavity has a substantially cylindrical or conical shape, or has a cylindrical wall extended by means of a conical base.

* * * * *